(No Model.) 3 Sheets—Sheet 1.
L. C. HUBER.
GAS GENERATING MACHINE.
No. 366,168. Patented July 5, 1887.
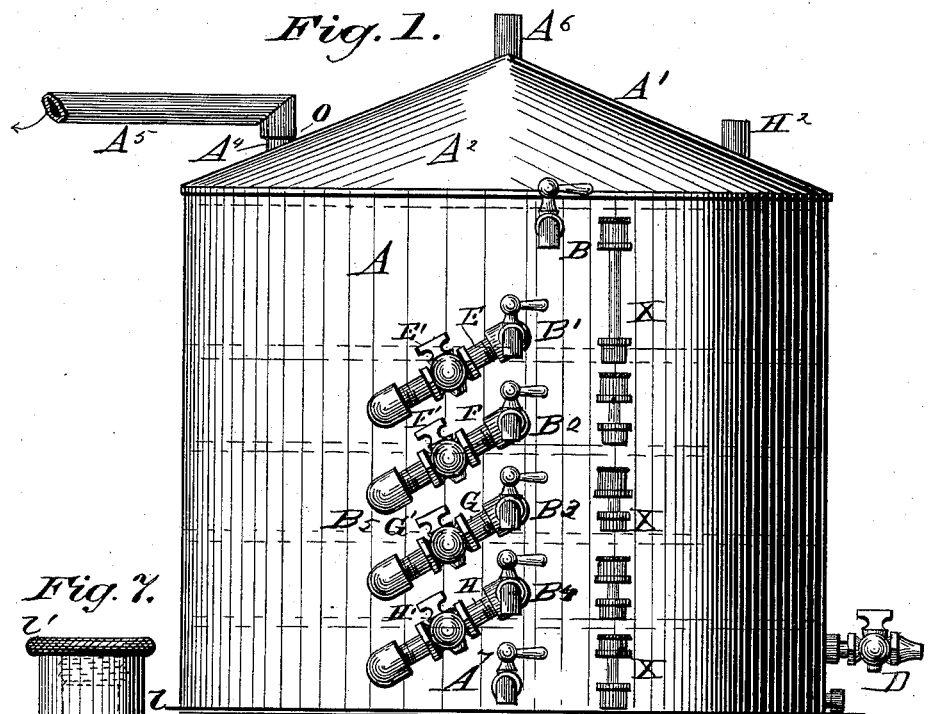
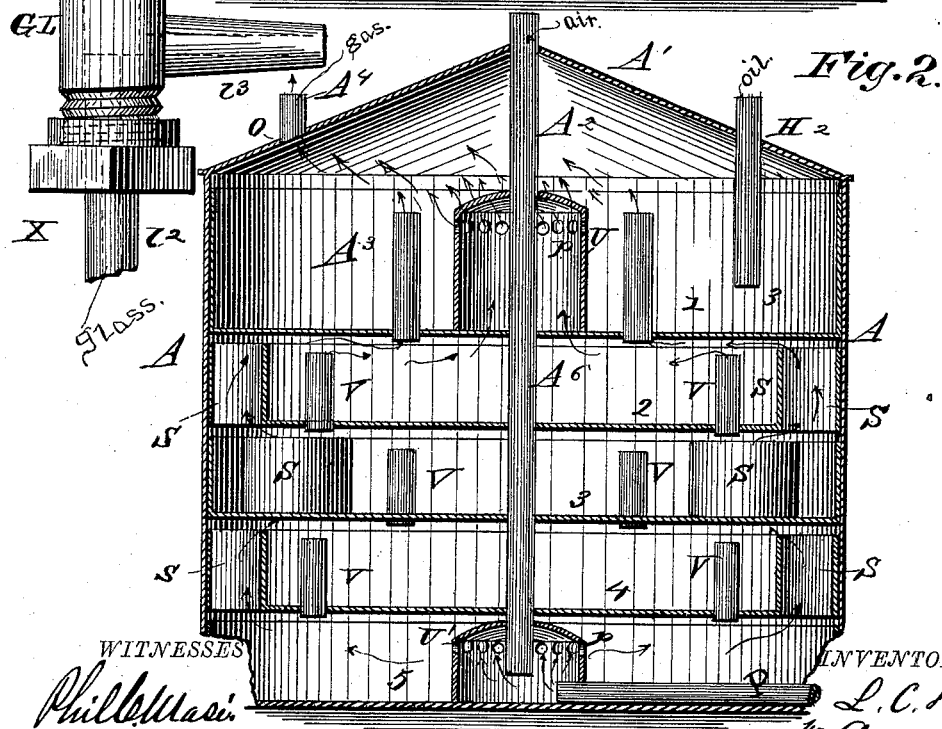
WITNESSES
INVENTOR
L. C. Huber
by Audnom Smith
his Attorneys (No Model.) 3 Sheets—Sheet 2.
L. C. HUBER.
GAS GENERATING MACHINE.
No. 366,168. Patented July 5, 1887.
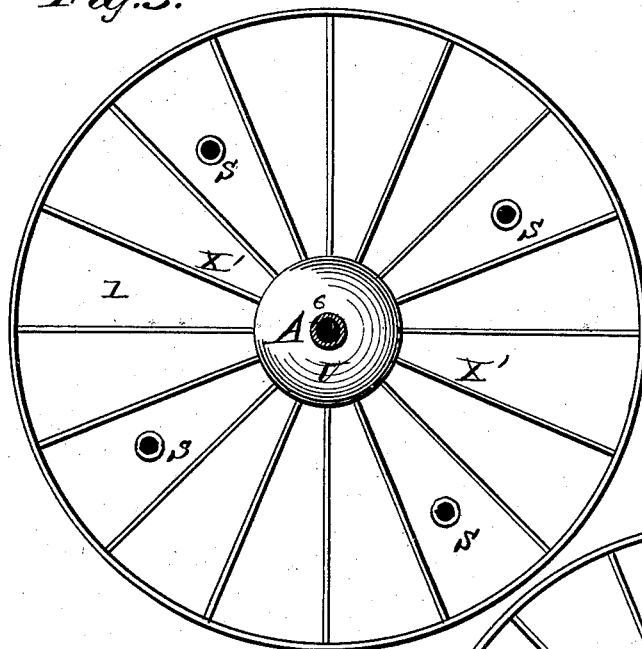
Fig. 3.
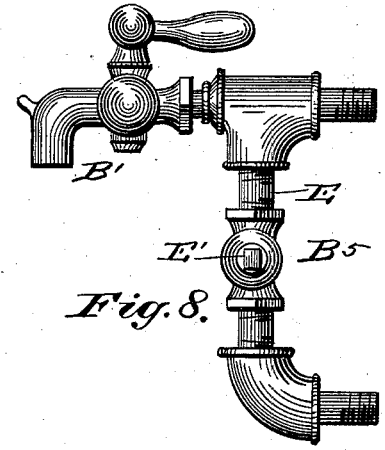
Fig. 8.
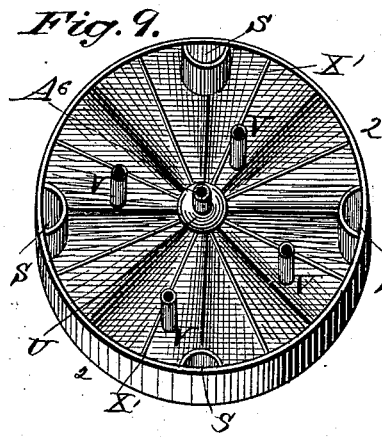
Fig. 9.
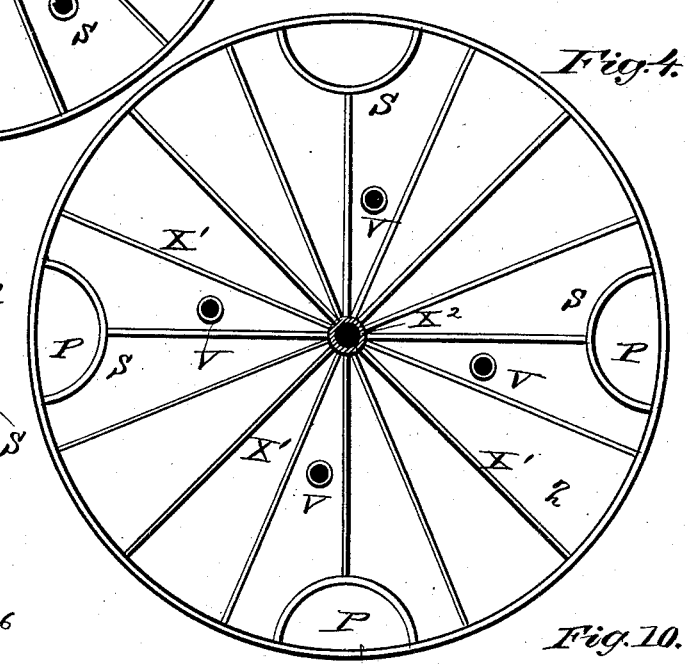
Fig. 4.
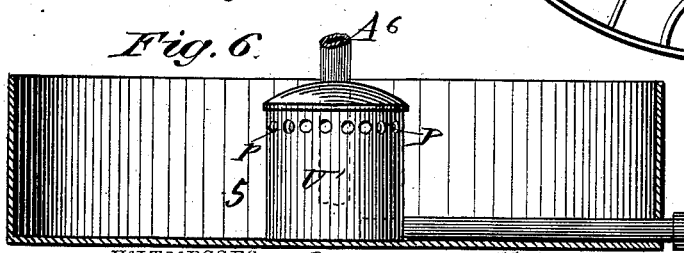
Fig. 6.
Fig. 10.
Fig. 5.
WITNESSES
Phill Mau
Benj Fugitt
INVENTOR
L. C. Huber,
by Anderson & Smith
Attorneys
N. PETERS, Photo-Lithographer, Washington, D. C.

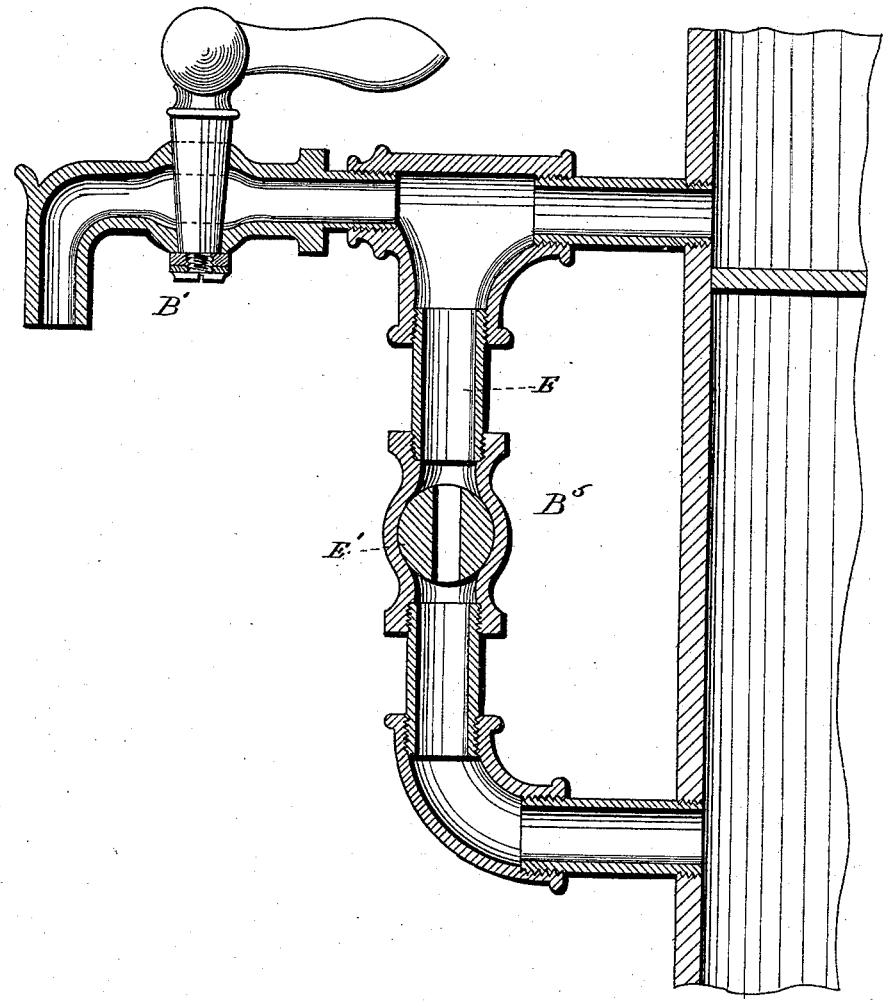

UNITED STATES PATENT OFFICE.

LOUIS CARSON HUBER, OF HUBER, ASSIGNOR TO THE EUREKA LIGHT MANUFACTURING COMPANY, OF LOUISVILLE, KENTUCKY.

GAS-GENERATING MACHINE.

SPECIFICATION forming part of Letters Patent No. 366,168, dated July 5, 1887.

Application filed April 3, 1886. Serial No. 197,698. (No model.)

*To all whom it may concern:*

Be it known that I, LOUIS CARSON HUBER, a citizen of the United States, resident at Huber, in the county of Bullitt and State of Kentucky, have invented certain new and useful Improvements in Gas-Generating Machines; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 represents a side elevation of the machine, showing the tubing between the pans. Fig. 2 is a central vertical section of the same. Fig. 3 is a plan view of the bottom pan. Fig. 4 is a plan view of one of the pans thereabove. Fig. 5 is a section showing the construction of the evaporating material. Fig. 6 is a central vertical section of the bottom pan, also illustrating the construction of the top pan. Fig. 7 is a side view, broken, of one of the glass gages. Fig. 8 is a side view of one of the tube attachments, by means of which the oil can escape from one pan to the next below. Fig. 9 is a perspective view of one of the pans between the lowest and highest. Fig. 10 is a detail view of one of the supports between the pans. Fig. 11 is a vertical sectional view of Fig. 8.

My invention relates to carbureting-machines; and it consists in the construction and novel combination of parts, as hereinafter described, and pointed out in the claims.

I am aware that it is not new, broadly, to combine with a carburetor-case a perforated air-chamber in the floor thereof, pans arranged above and with air-chambers, and having outflow-pipes and flues arranged in said pans at their peripheries, and upper perforated air-chamber, gas-chamber above the said perforated chamber, and means for supplying the lower air-chamber with external air.

Referring by letter to the accompanying drawings, A designates the gas-generator, which is provided with the cone-shaped top A', which forms an unobstructed gas-chamber, A², immediately over the upper or first oil-pan, A³. A short piece, A⁴, of pipe is soldered into the cone-shaped top A', barely passing through the top, and enters the gas-chamber A². To this pipe A⁴ is connected the pipe A⁵, which leads to the house, whereby the gas is distributed throughout the intermediate pipes connecting with the burner. The central pipe, A⁶, is connected with the air-pump, and through this pipe A⁶ the air passes to the bottom of the generator before coming in contact with the oil. In passing upward toward the gas-chamber through the vertical flues S S, &c., the air is forced to take a zigzag course over the surface of the oil in each of the oil-pans 1, 2, 3, 4, and 5, containing the textile or absorbing substance, and by this process by the time the air has reached the gas-chamber it is thoroughly carbureted, and is ready to pass into the gas-pipes to be consumed at the burner. The construction of pans Nos. 1 and 5 is the same, excepting that No. 1 has double the capacity of No. 5. Cock A⁷, Fig. 1, enters pan No. 5 just below the top of said pan, and is for the purpose of ascertaining when said pan is full of oil. Cocks B B' B² B³ B⁴ are in connection with the fixture B⁵, as shown in Fig. 8, which fixture enters the lower portion of one pan and the upper portion of the next pan immediately below it. The object of these cocks is to permit the oil to be drawn entirely out of each pan in the generator when desired.

E F G H are the pan feed-pipes, which are provided with stop-cocks E' F' G' H', any one of which may be opened to enable the oil to be drawn from any desired pan to another pan below it, to supply depleted pans with fresh oil and to pass all heavy oil to the bottom pan when refilling, as required. The glass gages X are for the purpose of showing the quantity of oil in each of the pans. Cock D enters the bottom pan, and, being left open while the machine is being filled, is a guide to show when the pan is full by the oil running out at said cock D. The pipe H² is the oil-filling pipe and passes through the top of the generator and down into the first pan, 1, at the point marked 3.

In Fig. 2 I have delineated a vertical section of the generator, showing the internal arrangement of the evaporating-pans, the air-chambers U U', the flues S, air-pipe A⁶, and the overflow-pipes V in the bottoms of the pans.

The arrows in Fig. 2 show the course of the air from the air-chamber U' in the bottom pan to the outlet O in the top of the generator. Each of the pans is supported in the center by being soldered to the air-pipe $A^6$, which passes through them. At their outer edges the pans are supported by being soldered at convenient points to the sides of the generator.

In machines of large diameter supports $a$, as shown in Fig. 10, are soldered to the bottom pan and extend to the bottom side of the next pan above, and on the bottom of the next pan, and in line with the support $a$ in the bottom pan, is a second support, $a$, which extends up to the bottom of the next pan and is soldered in like manner, and this system of supports is continued until a column is formed from pan to pan and the entire set of pans is supported.

Pans 2, 3, and 4 are similar in construction. They are each provided with four semicircular openings, S, which form flues for the passage of air and gas. The central opening, $X^2$, is the opening through which the air-pipe $A^6$ passes. Wires X' radiate from the centers to the circumferences of the pans, the heavy lines representing the radial wires near the bottoms of the pans and the lighter radial lines representing the wires near the top. The object of this wire frame, constructed in the manner described, is to utilize every square inch of the pan for weaving the evaporating material, jute, on an advantage not heretofore obtained in this class of generators. Pan No. 5 has no overflow-pipe. The overflow-pipes V in those pans which are therewith provided are just a little shorter than the height of the pans they are in, and the pipes V pass through the bottom of the pans. The overflow-pipes V dodge each other in the intermediate pans, and, in addition to acting as a medium to allow the oil to pass through them to each pan as each pan is in turn filled by them, they act as flues for the passage of air and gas up through and over the surface of the oil in each of the pans.

Pans 2, 3, and 4 contain the semicircular flues or openings S in addition to the overflow-pipes V. These flues S are so arranged in each pan as to have no one flue immediately opposite the other, but alternating, so as to have the effect of further distributing the air over the surface of the oil and evaporators.

G L designate the glass-gage fitting, $l$ being the packing-box, the cap $l'$ being screwed down into the opening through which the glass tube $l^2$ passes. This fixture is of cast-brass and is open throughout its entire length, except when closed by the glass tube and caps. The tube $l^3$ connects the glass tube with its proper pan, so that the oil in the pan will flow through into the glass tube, and will show in the tube the level of the oil in the pan.

The operation of the invention is as follows: After having located the generator and air-pump to light the building, the air-pump being connected to the air-pipe in the top of the generator, and the gas-pipe leading into the house being connected with the gas-pipe of the generator, oil is poured in the generator through the oil-fill, and when it rises to a sufficient height to pass off through the overflow-pipe leading into the second pan this pan is filled by the overflow from the first pan. This system of overflowing from pan to pan is kept up until the oil runs from the cock D, which is the overflow-cock, and shows that the whole system of pans is full. Each of the pans, as heretofore described, contains evaporating material with the proper air chambers and flues. The pressure of air from the pump passes down the air-pipe to the air-chamber in the bottom pan, and, passing out of this air-chamber through the perforations $p$ in its top, strikes the jute on the wire frame, said jute being saturated with oil, and carries the evaporated oil up through the openings in each pan until the gas-chamber is reached, when the air and gas are so thoroughly assimilated and mixed as to form by the combination a highly illuminating gas, known as "carbureted-air gas." The gas at this point is ready to pass out of the generator and into the pipes and burners throughout the house to be consumed at the burner. A steady pressure of air is kept up by the air-pump, which is kept in operation by weight power, until all of the lights have been turned off; then the generation of gas ceases and the action of the pump stops until one or more burners are lighted. The supply and demand of air and gas are at all times equal. After the generator has been filled with any of the gas-producing oils—viz., naphtha, mineral oil, &c.—and the air-pump wound up, the generation of gas and the action of the pump are entirely automatic.

P is a pipe running horizontally with the casing, with its inner end within the air-receptacle in the bottom pan. The outer end of said pipe can have the air-pump attached thereto, if desired, and when it is not convenient to attach the same to a vertical air-tube. The pipe P in practice has an inwardly-opening valve at its outer end.

Having described this invention, what I claim, and desire to secure by Letters Patent, is—

1. The combination, with the closed carburetor-case, of the lowest pan having the central perforated air-chamber, the upper pans having the air-escape opening S and the overflow-tubes V, the air-pipe descending centrally through the roof, with its lower end within the air-chamber in the lowest pan, and the couplings running from the bottom of one pan to the upper part of the next lower pan, and provided with a stop-cock to regulate or prevent the descent of oil, substantially as specified.

2. The combination, with the closed carburetor-case, of the lowest pan provided with the central perforated air-chamber, the upper pans having the air-escape openings and vent-tubes, the air-pipe descending through the roof of the generator and having its lower end in the air-chamber, the couplings running from the bottom of one pan to the upper part of the next lower pan, and each provided with a cock to prevent or regulate the flow of oil between the pans, and a cock for the discharge of oil from the upper pan, and the overflow-cock D, substantially as specified.

In testimony whereof I affix my signature in presence of two witnesses.

LOUIS CARSON HUBER.

Witnesses:
T. W. KENNEDY,
BEN. H. DUDLEY.